United States Patent [19]

Yamanishi

[11] Patent Number: 4,623,902
[45] Date of Patent: Nov. 18, 1986

[54] BELT-SHAPED MATERIAL CONVEYING APPARATUS

[75] Inventor: Eiichi Yamanishi, Kawasaki, Japan

[73] Assignee: Kabushiki Kaisha Toshiba, Japan

[21] Appl. No.: 694,249

[22] Filed: Jan. 24, 1985

[30] Foreign Application Priority Data

Jan. 27, 1984 [JP] Japan .................................. 59-12935

[51] Int. Cl.⁴ .............................................. G01D 15/10
[52] U.S. Cl. ................................ 346/76 PH; 346/106; 400/120; 400/249
[58] Field of Search ................ 346/76 PH, 76 R, 134, 346/135.1, 105, 106, 76 H, 106; 400/120, 225, 219, 219.1, 219.5, 249, 703; 242/57, 75.47, 186, 188; 219/216 PH; 250/319, 570, 557; 226/45; 250/557

[56] References Cited

U.S. PATENT DOCUMENTS

4,463,913 8/1984 Sato ...................................... 242/57
4,492,965 1/1985 Ohnishi et al. .................. 346/76 PH

*Primary Examiner*—A. Evans
*Attorney, Agent, or Firm*—Finnegan, Henderson, Farabow, Garrett & Dunner

[57] ABSTRACT

At the time of conveying a transfer printing belt-shaped material having known length and utilized in a tape recorder, a picture image forming apparatus or the like by an electric motor, the length of the belt-shaped material remaining after any point thereof is determined and displayed. The remaining length is determined by generating pulses in accordance with the rotation of the motor and then counting the number of pulses with a counter. Since the length of the belt-shaped material is known by correlating the length and the count of the counter with a computer the remaining length can be determined.

19 Claims, 43 Drawing Figures

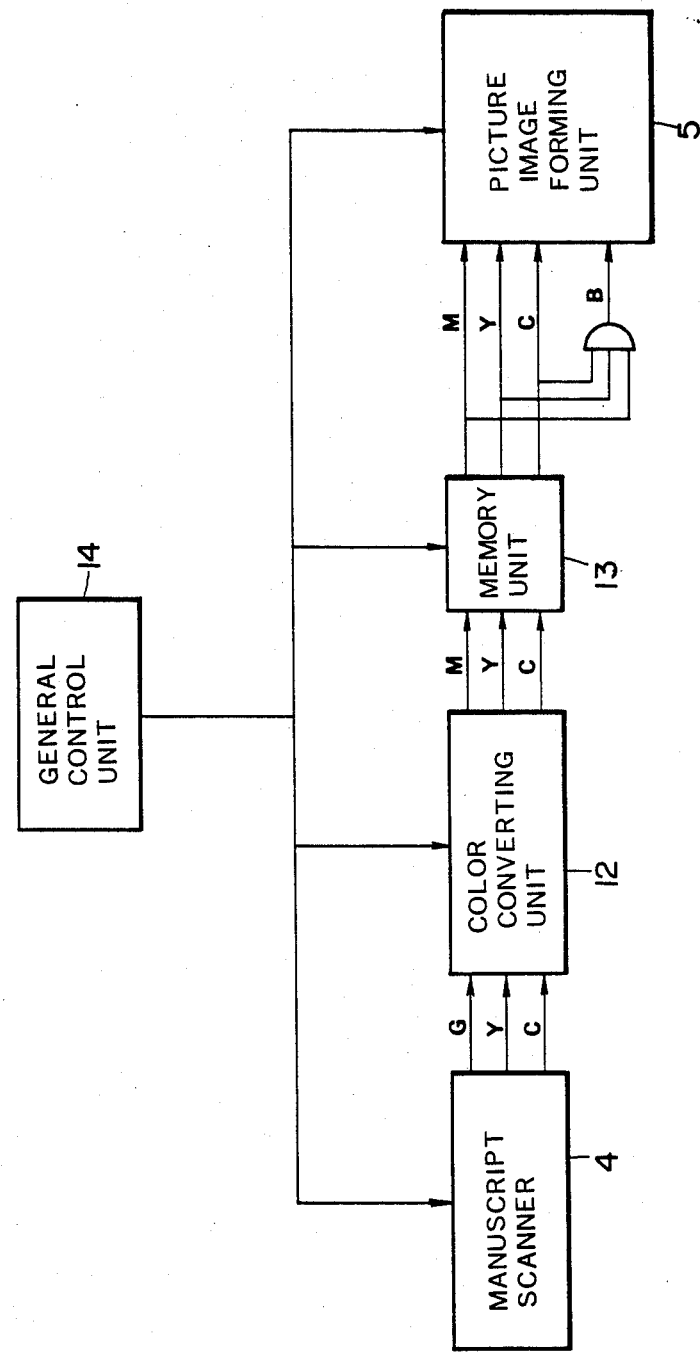

FIG.19(A)

| COUNTS OF COUNTER | CONTROL INFORMATION | |
|---|---|---|
| | 51a | 51b |
| 117 | 6H | 9H |
| 116 | ↓ | ↓ |
| ↓ | | |
| 83 | 5H | 9H |
| ↓ | ↓ | ↓ |
| 52 | | |
| 51 | 1H | DH |

FIG.19(B)

| COUNTS OF COUNTER | CONTROL INFORMATION | |
|---|---|---|
| | 51a | 51b |
| 117 | DH | 1H |
| 116 | ↓ | ↓ |
| ↓ | | |
| 83 | CH | 2H |
| ↓ | ↓ | ↓ |
| 52 | | |
| 51 | 9H | 6H |

FIG.19(C)

| COUNTS OF COUNTER | CONTROL INFORMATION | |
|---|---|---|
| | 51a | 51b |
| 117 | AH | 5H |
| 116 | ↓ | ↓ |
| ↓ | | |
| 83 | 9H | 6H |
| ↓ | ↓ | ↓ |
| 52 | | |
| 51 | 5H | AH |

FIG.19(D)

| COUNTS OF COUNTER | CONTROL INFORMATION | |
|---|---|---|
| | 51a | 51b |
| 117 | 0H | 9H |
| 116 | ↓ | ↓ |
| ↓ | | |
| 83 | 0H | BH |
| ↓ | ↓ | ↓ |
| 52 | | |
| 51 | | FH |

| COUNTS OF COUNTER | DISPLAY INFORMATION |
|---|---|
| 117 | 0 0 0 0 0 0 0 0 0 0 0 0 |
| ↓ | ↓ |
| 83 | 0 0 0 0 0 0 1 1 1 1 1 1 |
| ↓ | ↓ |
| 51 | 1 1 1 1 1 1 1 1 1 1 1 1 |

FIG.26(A)
| | | OPERATION | MOTOR | DIRECTION OF TORQUE | TORQUE | DIRECTION OF ROTATION |
|---|---|---|---|---|---|---|
| (1) | 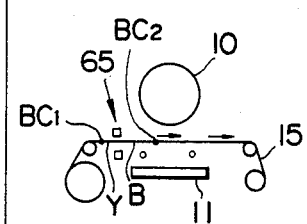 | DIRECTION OF BAR CODE | 51a | ↻ | Tai F | ↻ |
| | | | 51b | ↻ | Tbi F | ↻ |
| (2) |  | STOP | 51a | ↻ | Tai S | |
| | | | 51b | ↻ | Tbi S | |
| (3) |  | COUNTING | 51a | ↻ | Tai B | ↻ |
| | | | 51b | ↻ | Tbi B | ↻ |
| (4) |  | TERMINATION OF COUNTING STOP | 51a | ↻ | TaA (ra) | |
| | | | 51b | ↻ | TbA (rb) | |

FIG.26(B)
| | | OPERATION | MOTOR | DIRECTION OF TORQUE | TORQUE | DIRECTION OF ROTATION |
|---|---|---|---|---|---|---|
| (5) | 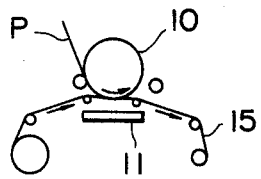 | POSITION ALIGNMENT OF PAPER GUIDE AND RIBBON | 51a | ↻ | TaM (ra) | ↻ |
| | | | 51b | ↻ | TbM (rb) | ↻ |
| (6) |  | STOP | 51a | ↻ | TaA (ra) | ╱ |
| | | | 51b | ↻ | TbA (rb) | ╱ |
| (7) |  | APPLY PRESSURE TO HEAD | 51a | ↻ | TaA (ra) | ↻ (dashed) |
| | | | 51b | ↻ | TbA (rb) | ↻ (dashed) |
| (8) |  | PRINTING | 51a | ↻ | TaP (ra) | ↻ |
| | | | 51b | ↻ | TbP (rb) | ↻ |

FIG. 26(C)

| | | OPERATION | MOTOR | DIRECTION OF TORQUE | TORQUE | DIRECTION OF ROTATION |
|---|---|---|---|---|---|---|
| (9) | *[diagram: 10, P, Pr, ℓr, 11, 15]* | TERMINATION OF PRINTING | 51a | ↻ | TaH (ra) | |
| | | | 51b | ↻ | TbH (rb) | |
| (10) | *[diagram: 10, 11, 15]* | PEEL OF | 51a | ↻ | TaH (ra) | ↻ |
| | | | 51b | ↻ | TbH (rb) | ↻ |
| (11) | *[diagram: 10, P, Pr, M, Y, ℓr, 11, 15]* | COMPLETION OF PEELING OFF | 51a | ↻ | TaA (ra) | |
| | | | 51b | ↻ | TbA (rb) | |
| (12) | *[diagram: 10, 11, 15]* | RELEASE HEAD | 51a | ↻ | TaA (ra) | ↻ (dashed) |
| | | | 51b | ↻ | TbA (rb) | ↻ (dashed) |

FIG.26(D)
| | | OPERATION | MOTOR | DIRECTION OF TORQUE | TORQUE | DIRECTION OF ROTATION |
|---|---|---|---|---|---|---|
| (13) | 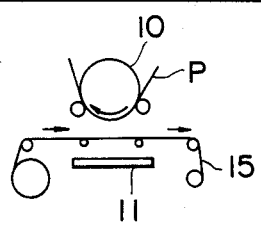 | RETURN COPYING PAPER | 51a | ↺ | TaM (ra) | ↺ |
| | | ALIGN RIBBON POSITION | 51b | ↺ | TbM (rb) | ↺ |
| (14) |  | STOP | 51a | ↺ | TaA (ra) | / |
| | | | 51b | ↺ | TbA (rb) | / |
| (15) |  | APPLY PRESSURE TO HEAD | 51a | ↺ | TaA (ra) | (↻) |
| | | | 51b | ↺ | TbA (rb) | (↺) |
| (16) |  | ALIGN LEADING ENDS OF RIBBON AND COPYING PAPER | 51a | ↺ | TaH (ra) | ↻ |
| | | | 51b | ↺ | TbH (rb) | ↻ |

FIG. 26 (E)
| | | OPERATION | MOTOR | DIRECTION OF TORQUE | TORQUE | DIRECTION OF ROTATION |
|---|---|---|---|---|---|---|
| (17) | 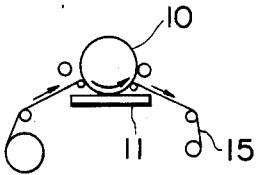 | PRINTING ↓ PRINTING TERMI- NATES ↓ PEEL OFF ↓ DISCHARGE PAPER | SAME AS (8) | | | |
| (18) | 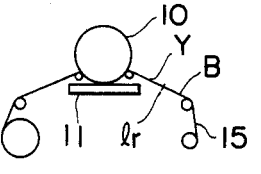 | END OF PAPER DISCHARGE AND PEELING OFF | SAME AS (11) | | | |
| (19) | 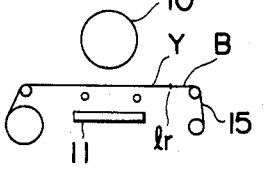 | RELEASE HEAD | SAME AS (12) | | | |
| (20) | 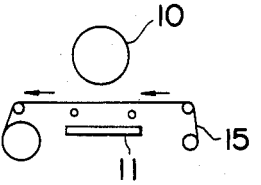 | MOVE RIBBON TO INITIAL POSITION | 51a |  | TaB (ra) |  |
| | | | 51b |  | TbB (rb) |  |

FIG. 27(A)
| | | OPERATION | MOTOR | DIRECTION OF TORQUE | TORQUE | DIRECTION OF ROTATION |
|---|---|---|---|---|---|---|
| (1) | 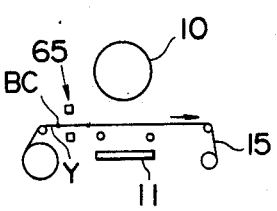 | DETECTION OF BAR CODES | 51a | ↻ | 0 | ↻ |
| | | | 51b | ↻ | (Taic) | ↻ |
| (2) |  | STOP | 51a | ↻ | Tai | ╱ |
| | | | 51b | ↻ | Tbi | ╱ |
| (3) |  | APPLY PRESSURE TO HEAD | 51a | ↻ | Tai | ↻ (dashed) |
| | | | 51b | ↻ | Tbi | ↻ (dashed) |
| (4) |  | START ROTATION OF PLATEN | 51a | ↻ | Tai | ↻ |
| | | START COUNTING | 51b | ↻ | Tbi | ↻ |

FIG.27(B)

| | | OPERATION | MOTOR | DIRECTION OF TORQUE | TORQUE | DIRECTION OF ROTATION |
|---|---|---|---|---|---|---|
| (5) | | STOP ROTATION OF PLATEN | 51a | ↻ | Tai | |
| | | TERMINATION OF COUNTING | 51b | ↻ | Tbi | |
| (6) | | ROTATE PLATEN IN OPPOSITE DIRECTION | 51a | ↻ | TaH (ra) | ↻ |
| | | | 51b | ↻ | TbH (rb) | ↻ |
| (7) | | STOP PLATEN | 51a | ↻ | TaA (ra) | |
| | | | 51b | ↻ | TbA (rb) | |
| (8) | | RELEASE HEAD | 51a | ↻ | TaA (ra) | ↻ |
| | | | 51b | ↻ | TbA | ↻ |

BELT-SHAPED MATERIAL CONVEYING APPARATUS

BACKGROUND OF THE INVENTION

1. Field of the Invention

This invention relates to apparatus for conveying such belt-shaped materials as tapes utilized for a tape recorder or the like, and ribbon shaped transfer printing member utilized for picture image forming apparatus or the like, and more particularly apparatus which while conveying a belt-shaped material can determine the remaining (not yet used) length of the belt-shaped material and can visually display the remaining length, if desired.

2. Description of the Prior Art

As is well known in the art, in the operation of a tape recorder or a picture image forming apparatus, means for paying out and taking up the tape or transfer printing member, or a belt-shaped material conveying apparatus is generally used. Taking the conveying apparatus of the transfer printing member utilized for picture image forming apparatus as an example, a thermal transfer printing type apparatus will be described hereunder. The thermal transfer type image forming apparatus is constructed such that the image transfer is achieved with the aid of a thermal head acting as a recording head using an image transfer printing material with a thermally fusible or vaporizable coloring agent coated thereon. Since the conventional thermal transfer printing type image forming apparatus is designed to have a small size, and can be manufactured at a low cost, it generates less noise and can use an ordinary sheet of paper as the transfer printing material, so that such apparatus are now being widely used not only for the purpose of recording the outputs of computers, word processors or the like but also as copying machines.

However, prior art transfer copying member conveying apparatus utilized for the picture image forming apparatus of the type described above is not provided with any means that can efficiently detect the remaining quantity of the transfer printing member so that the operator is required to visually confirm the remaining quantity. Accordingly, it has been difficult to always know the remaining quantity and to accurately confirm the same visually.

SUMMARY OF THE INVENTION

Accordingly, it is an object of this invention to provide novel belt-shaped material conveying apparatus capable of accurately detecting the remaining quantity of such a belt-shaped material as a transfer printing member with simple construction.

Another object of this invention is to provide belt-shaped material conveying apparatus suitable for use in a tape recorder or an image forming apparatus capable of readily determining the remaining length of the belt-shaped material and displaying the same with a simple computer.

According to this invention there is provided apparatus for conveying a belt-shaped material of a known length, comprising a driving motor for conveying the belt-shaped material in the longitudinal direction thereof, means for generating pulse signals proportional to the number of revolutions of the driving motor, counting means for counting the number of the pulse signals, and means for calculating the length of the belt-shaped material remaining after any point along the belt-shaped material based on the count of the counting means and the total length of the belt-shaped material.

In a preferred embodiment, a display means is provided for displaying the calculated remaining length. This makes efficient use and prevents breakage of the belt-shaped material utilized in a tape recorder, picture image forming apparatus or the like.

BRIEF DESCRIPTION OF THE DRAWINGS

In the accompanying drawings:

FIG. 7 is a block diagram showing principal component elements of a thermal transfer printing unit;

FIGS. 19A through 19D are diagrams showing the construction of the ROM shown in FIG. 17;

FIGS. 26A through 26F are diagrams useful for explaining the operation of the thermal transfer printing unit; and FIGS. 27A and 27B are similar diagrams useful to explain different initial operation from that of FIGS. 26A through 26F.

DESCRIPTION OF THE PREFERRED EMBODIMENT

A preferred embodiment of this invention will be described hereunder with reference to the accompanying drawings by taking conveying apparatus of a transfer printing member utilized in a thermal transfer type picture image forming apparatus as an example.

Figure 1:
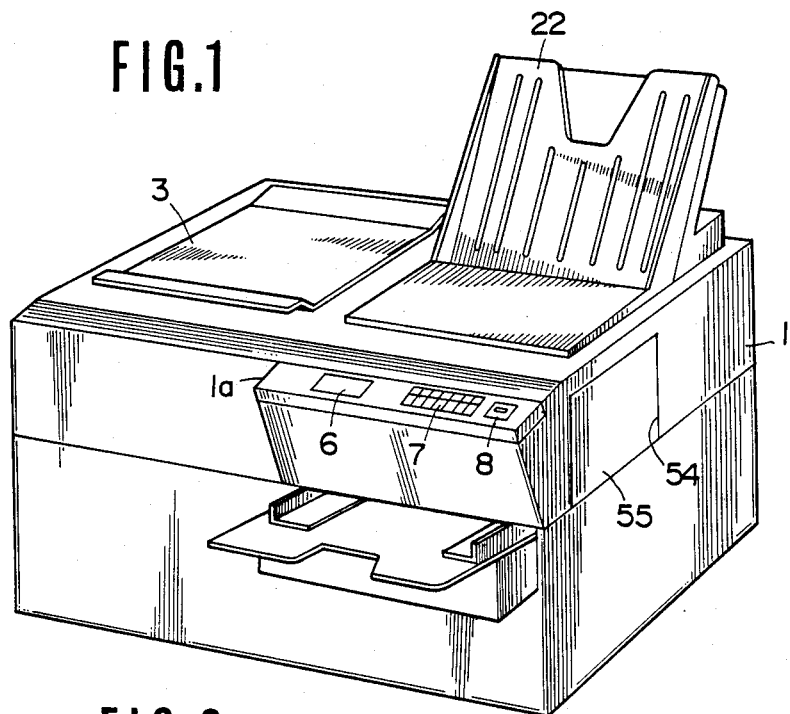
FIG. 1 is a perspective view showing one example of an image forming apparatus utilizing the belt-shaped material conveying apparatus according to this invention.
Figure 2:
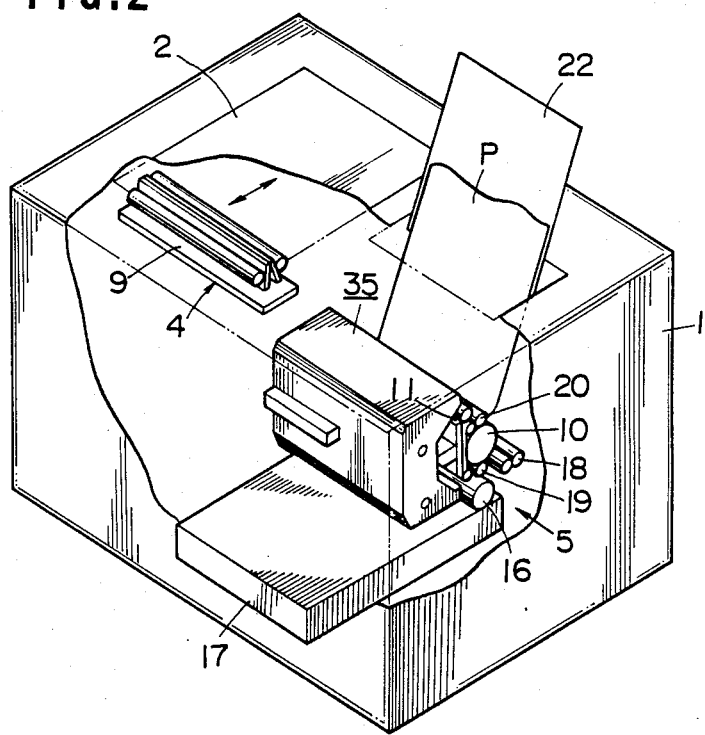
FIG. 2 is a perspective view, partly cut away, of the image forming apparatus shown in FIG. 1.

In FIGS. 1 and 2, reference numeral 1 designates a housing of the picture image forming apparatus, and an operation panel 1a is provided for the upper portion of the front surface of the housing 1. On the left side of the upper surface of the housing is provided a manuscript or original supporting board 2 having a manuscript clamping cover 3, and a manuscript scanning unit or scanner 4 which scans the manuscript set on the original supporting board is disposed beneath thereof. In the right side of the housing is contained a picture image forming unit (a printer) 5.

A display device 6, a setter made up of a ten key 7 for setting the number of copies, and a push button 8 are mounted on the operating panel 1a.

As shown in FIG. 2, the manuscript scanning unit 4 is constructed such that the manuscript set on the manuscript supporting board 2 is optically scanned by reciprocating a movable scanning unit including an exposure optical system along the lower surface of the manuscript supporting board 2 to obtain optical informations, and that the optical informations are converted into electric informations which are applied to the picture image forming unit 5.

Figure 3:
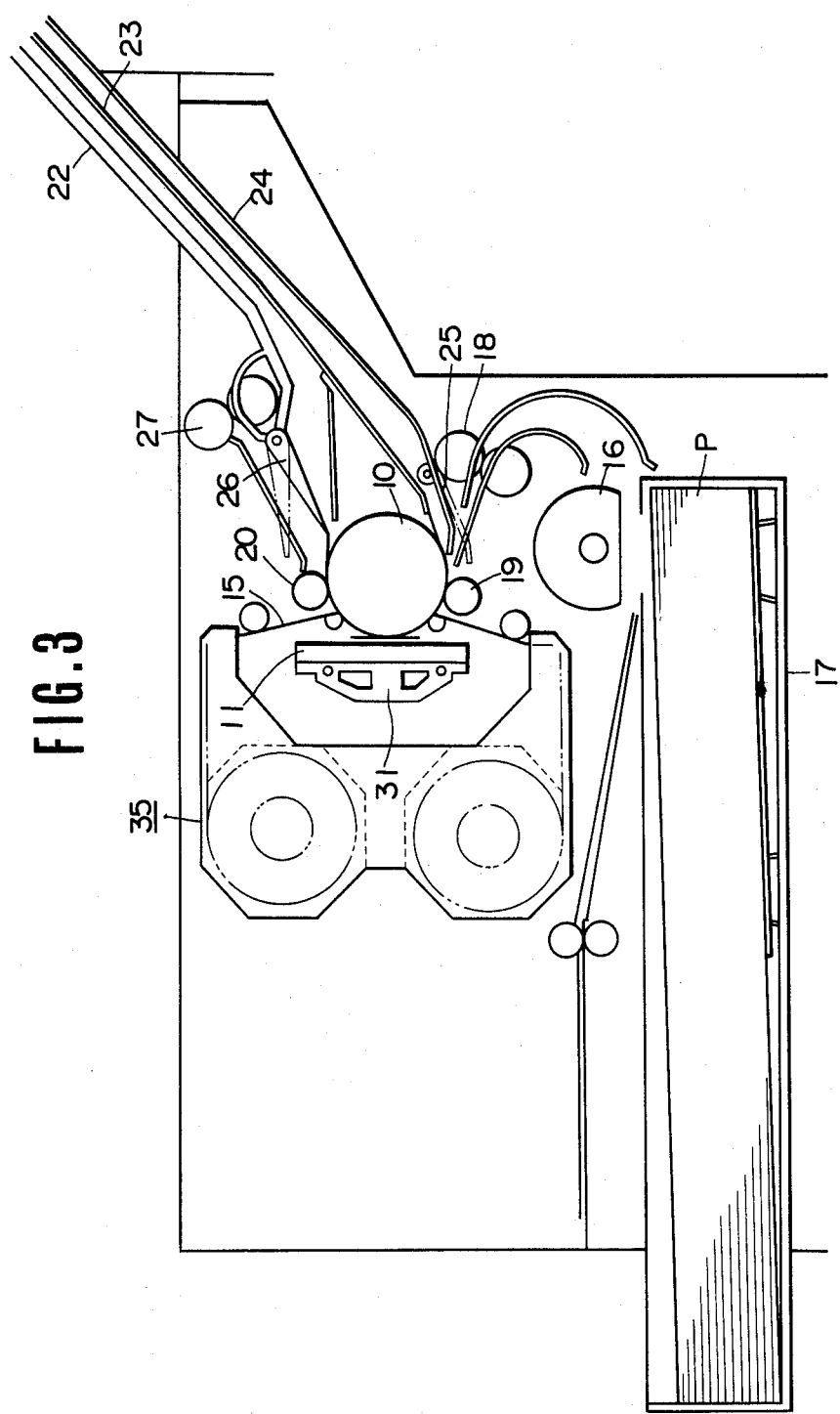
FIG. 3 is a vertical sectional view of the image forming apparatus shown in FIGS. 1 and 2 showing the interval construction thereof.

The picture image forming unit 5 has a construction as shown in FIGS. 2 and 3. More particularly, a platen 10 is disposed at substantially the center of the picture image forming unit 5, and to the left (as viewed in FIG. 3) of the platen 10 is disposed a thermal head 11 acting as a recording head to be movable toward and away from the platen 10.

A thermal transfer printing ribbon 15 (ink ribbon), that is a transfer printing member is interposed between the thermal head 11 and the platen 10. A copying paper P is urged against the platen 10 with the thermal transfer printing ribbon 15 interposed therebetween. Under these conditions, when thermal elements (not shown) formed on the thermal head in the form of dots and lines are caused to generate heat in accordance with the picture informations, the coloring agents (ink) on the thermal transfer printing ribbon 15 are heat melted and transfer printed onto the copying paper P. It should be noted that vaporizable ink may be used instead of thermoplastic one as described above.

A paper supply roller 16 is disposed beneath the platen 10 for sequentially feeding the copying paper P contained in a paper cassette 17. The front edges of the payed out copying papers P are aligned by a pair of registering rollers 18 disposed above the paper supply roller 16. The copying papers P are then conveyed toward the platen 10 and positively conveyed while being wrapped about the platen 10 by push rollers 19 and 20.

Figure 4:
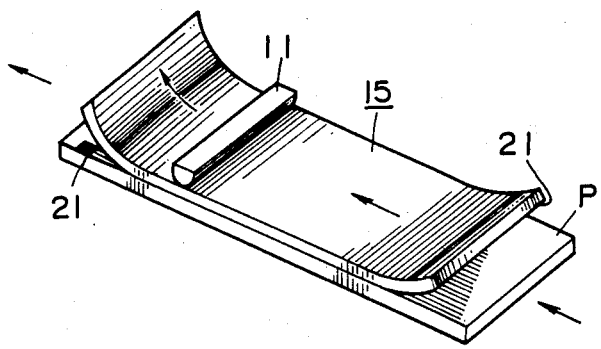
FIG. 4 is a perspective view for explaining the transfer printing operation.

The thermal head 11 urges the copying paper P against the platen 10 through the thermal transfer printing ribbon 15 so as to heat melt the coloring agents, that is ink on the thermal transfer printing ribbon 15, thereby transfer printing the molten ink onto the copying paper P as shown in FIG. 4.

Figure 5:
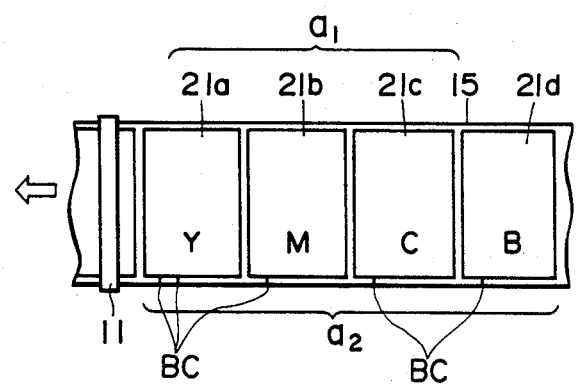
FIG. 5 is a plan view showing ink coating state on a thermal transfer printing ribbon.

As shown by a region $a_1$ in FIG. 5, the thermal transfer printing ribbon 15 has juxtaposed ink sections 21a, 21b and 21c of yellow (Y), magenta (M), cyan (C) and black (B), each section having substantially the same size as the copying paper P. Thus, after transfer printing one color, the copying paper is returned to the original position so as to accurately superpose various colors.

Along one side edge of the thermal transfer printing ribbon 15 corresponding to respective ink sections 21a–21d are provided bar codes adapted to discriminate respective ink sections 21a–21d for controlling alignment of the leading edges of respective ink sections 21a–21d and the leading edges of respective copying paper P. These bar codes BC are read by a bar code sensor 65 shown in FIG. 8 to be subsequently described.

Where it is desired to clearly print black color, the black color ink section 21d is incorporated into the thermal transfer printing ribbon. However, without the black color ink section 21d, substantially black color can be provided by superposing the other three colors.

As above described, the copying paper P is reciprocated by the rotation of the platen 10 by a number equal to the number of colors. At this time, the copying paper P is guided by first and second guides 23 and 24 sequentially disposed along the lower surface of paper discharge guides 23 and 24 which are superposed one upon the other.

Figure 6A:
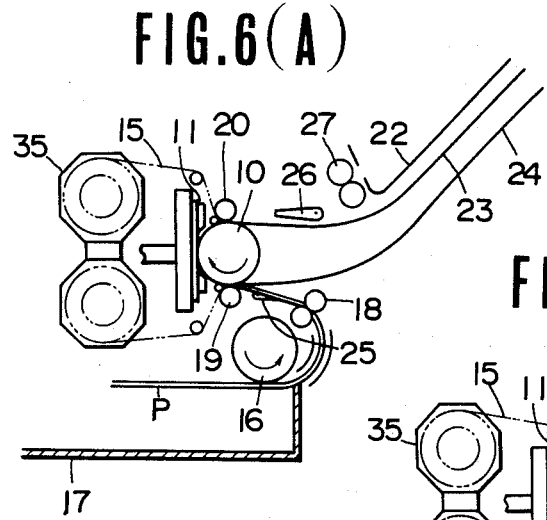
FIGS. 6A through 6D are side views showing movement of a sheet of paper at the time of multicolour transfer printing.

Referring now to FIGS. 6A through 6D, the copying sheet P sent from the paper feed cassette 17 is wrapped about the platen 10 through a register roller 18 and a first distributing guide 25 (see FIG. 6A).

Then the platen 10 is rotated by a pulse motor, not shown, to convey the copying paper P at a predetermined speed and the heat generating elements (not shown) of the thermal head 11, which are formed as dots and lines along the axial direction of the platen 10, are caused to generate heat in accordance with picture image informations, whereby the ink 21 of the thermal transfer printing ribbon 15 is transfer printed onto the copying paper P.

Figure 6B:
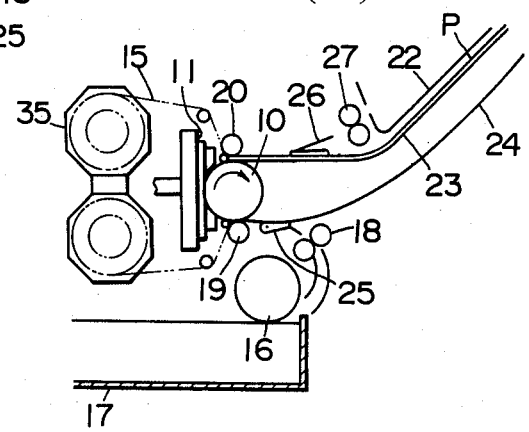

The copying paper P which has passed by the platen 10 is sent onto the first guide 23 extending along the lower surface of the paper discharge tray 22 by the second distributing guide 26 (see FIG. 6B).

Figure 6C:
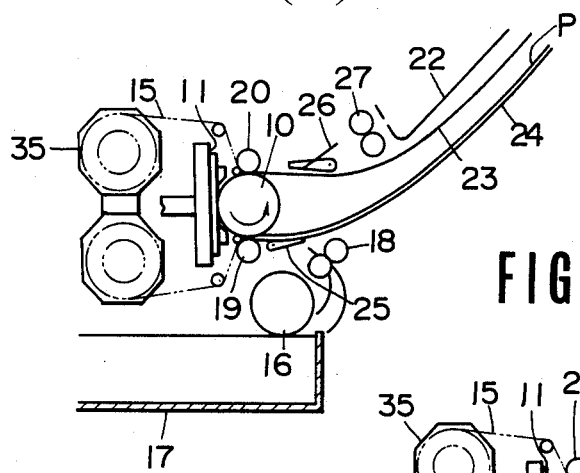

As the platen 10 is rotated in the opposite direction, the copying paper P transfer printed with ink 21 of the first color is conveyed in the opposite direction and then sent onto the second guide 24 extending along the lower surface of the first guide by the rotation of the first distribution guide 25 (see FIG. 6C).

As above described by reciprocating a number of times the copying paper P, a plurality of colors are transfer printed.

Figure 6D:
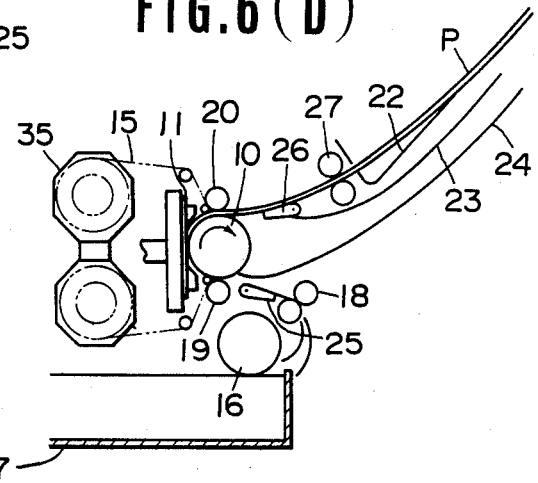

Finally, the copying paper P transfer printed with inks of all colors is guided to a pair of paper discharge rollers 27 by the second distributing guide 26 to be discharged onto the paper discharge tray 22 (see FIG. 6D).

As shown in FIG. 7, the picture image forming apparatus is constituted by a manuscript scanner 4, color converting unit 12, a memory unit 13, a picture image forming unit 5 and a general control unit 14.

The values of respective color components of green (G), yellow (Y) and cyan (C) which are detected by the manuscript scanner 4 are converted into the colors of magenta (M), yellow (Y) and cyan (C) of the printing ink by the color converting unit 12. These converted values of respective colors are stored in the memory unit 13 together with the positional informations of the manuscript. At the image forming unit 5, in accordance with the values read out from the memory unit 13, the printing inks of magenta (M), yellow (Y), cyan (C) and black (B) (black is formed by an AND output of magenta (M), yellow (Y) and cyan (C)) are transfer printed on the copying paper. The general control unit 14 is adapted to control all of the manuscript scanner 4, color converting unit 12, memory unit 13 and picture image forming unit 5.

The pair of paper discharge rollers 27, paper discharge tray 22, first and second guides 23 and 24 are constructed as an integral unit which can be taken out when desired.

Figure 8:
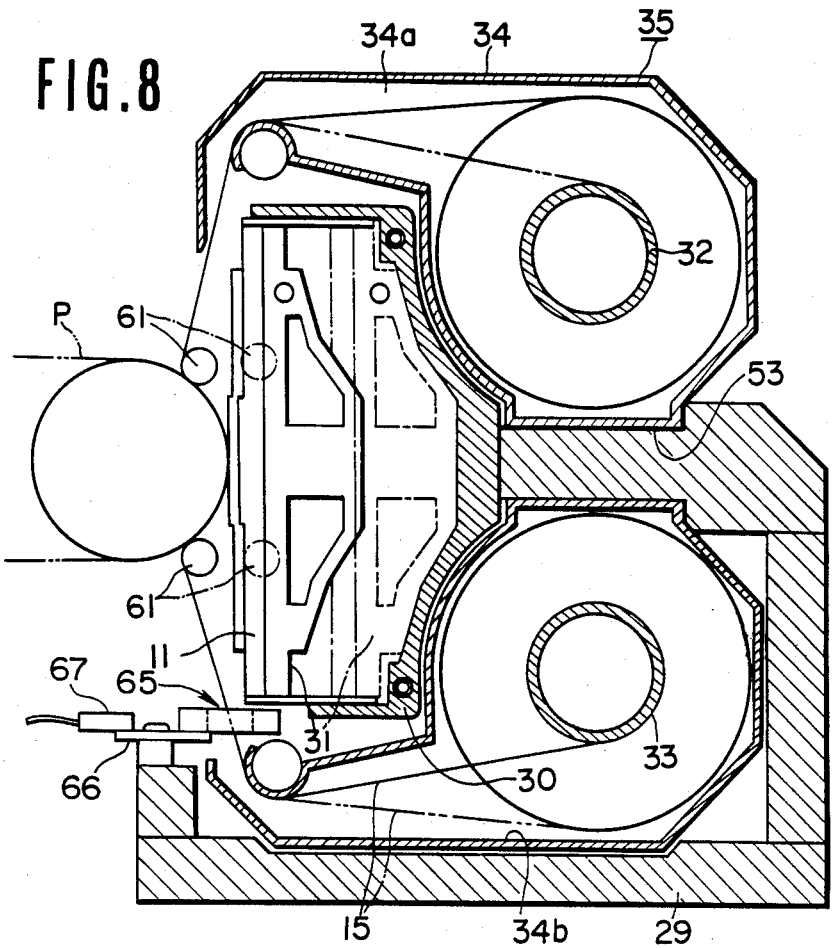
FIG. 8 is an enlarged vertical sectional view of the thermal transfer printing unit.

As shown in detail in FIG. 8, the thermal head 11 is mounted on a head holder 31 also acting as a heat dissipating board with its back surface surrounded by a member 30 secured to the frame block 29. The thermal transfer ribbon 15, and take up cores 32 and 33 taking up opposite ends of the ribbon 15 are incorporated into a casing 34 to form a cassette 35 which is detachably mounted on the frame block 29. The frame block 29 has a cross-sectional configuration of a letter U and is integrally made with casting or plastic, etc. so as to have sufficient strength. By fitting one of the take up cores of the ribbon cassette into the U shaped block, the ribbon cassette can be precisely positioned. While the ribbon cassette is being fitted, one end of the U shaped frame block 29 receives the side edge of the thermal transfer printing ribbon 15 and a bar code sensor 65 is provided for detecting the bar codes BC at one side edge of the thermal transfer printing ribbon 15. The bar code sensor 65 takes the form of a so-called photointerrupter in which a luminous element and a light receiving element are disposed to confront with each other. The bar code sensor 65 is mounted on a printing plate 66 secured to the frame block 29. The output signals of the bar code sensor 65 are supplied to processing apparatus to be described later through a connector 67 mounted on the printing plate 66.

Figure 9:
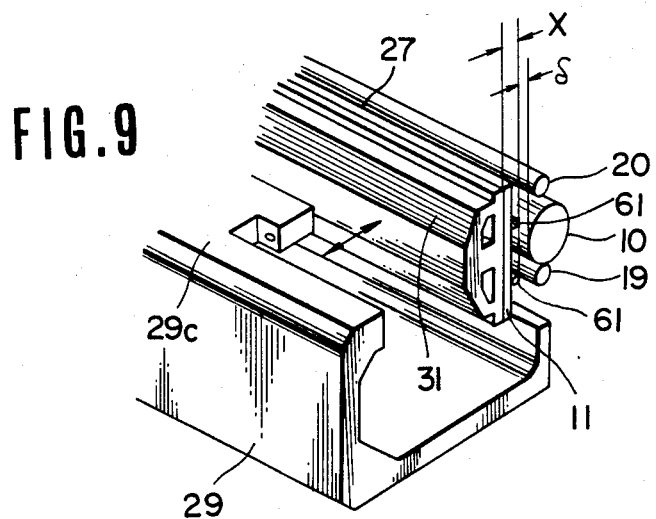
FIG. 9 is a fragmental perspective view of the thermal transfer printing unit with a thermal head and ribbon guides moved away from a platen.

As shown in FIG. 9, a head holder 31 supporting the thermal head 11 is constructed to be movable by a distance X in a direction toward and away from the platen 10. A gap δ for accommodating the thermal transfer printing ribbon 15 is defined between ribbon guides 61 for facilitating the reciprocating motion of the copying paper P and the mounting and dismounting of the ribbon cassette.

Figure 10:
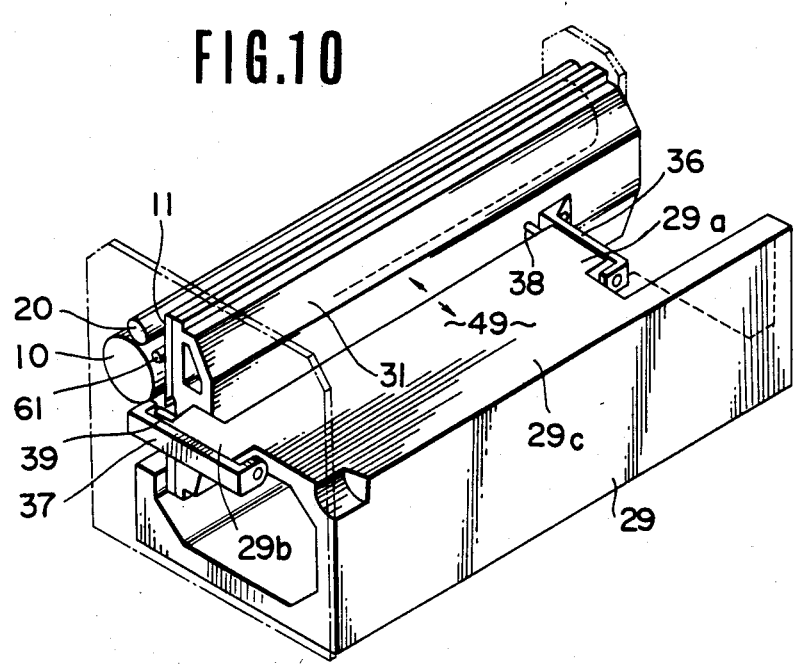
FIG. 10 is a perspective view of the thermal transfer printing unit showing a head holder mounted with a thermal head.
Figure 11:
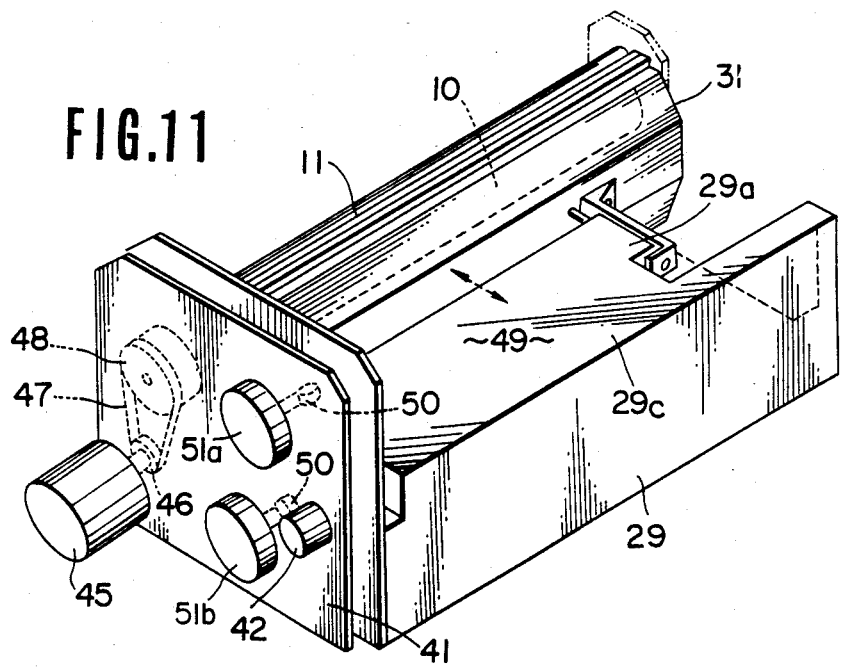
FIG. 11 is a perspective view showing drive systems of the platen, thermal transfer printing ribbon and thermal head.

More particularly, as shown in FIGS. 10 and 11, guide shafts 38 and 39 are secured to the head holder 31 via stays 36 and 37, intermediate portions of the guide shafts 38 and 39 being supported by linear bearings embedded in bearings 29a and 29b provided for the frame block 29.

Figure 12:
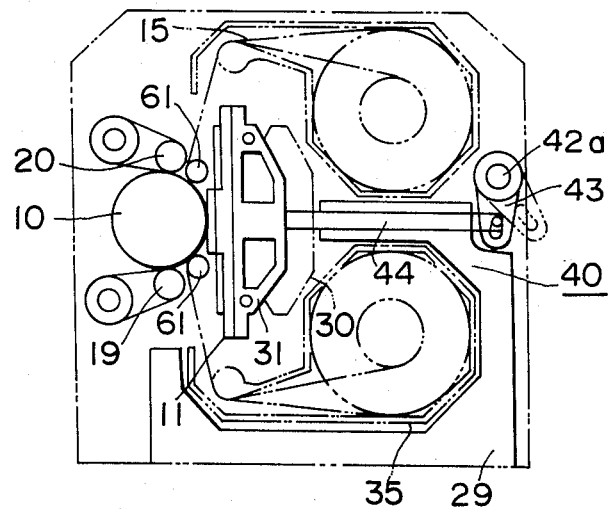
FIG. 12 is a side view showing a contact mechanism for urging the thermal head against the platen.

The movement of the reciprocatably supported head holder 31 toward and away from the platen 10 is controlled by a head shift mechanism 40. More particularly, as shown in FIG. 11, a head driving motor 42 is mounted on a motor frame 41, and as shown in FIG. 12, an arm 43 is secured to the shaft 42a of the motor 42.

One end of a connecting link 44 is connected to arm 43, while the other end is connected to the head holder 31 so that the rotation of the arm 43 is converted into a reciprocating motion which is transmitted to the head holder 31.

As shown in FIG. 11, a platen drive motor 45 in the form of a pulse motor is provided for the motor frame 41 to which the head driving motor 42 is secured. The driving force of motor 45 is transmitted to platen 10 also acting as copying paper transfer means via a motion transmitting mechanism comprising a pulley 46, a belt 47 and a pulley 48 for moving the platen 10 in the forward or reverse direction. Ribbon driving motors 51a and 51b respectively having couplings 50 are mounted at a position corresponding to a cassette mounting unit 49 supporting the ribbon cassette.

Figure 13:
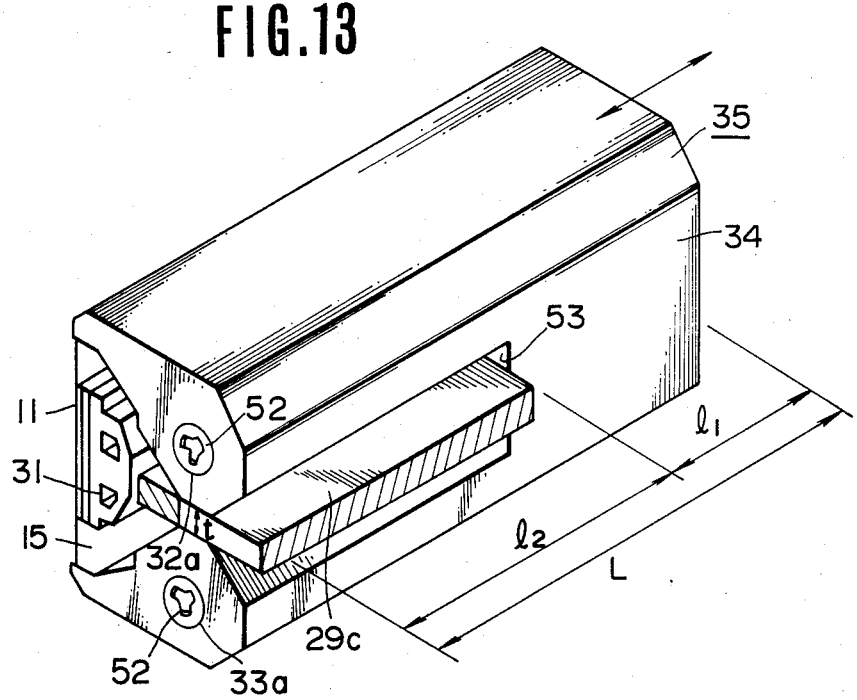
FIG. 13 is a perspective view showing the manner of mounting a ribbon cassette.

As shown in FIG. 13, the driving power receiving ends 32a and 33a of the take up cores 32 and 33 taking up the opposite ends of the transfer printing ribbon 15 accommodated in the ribbon cassette project outwardly through perforations formed through the end surface of the casing 34. These projecting ends are formed with recesses 52.

When the ribbon cassette 35 is accurately mounted at a predetermined position, couplings 50 engage the recesses 52 of the take up cores 32 and 33 for taking up the thermal transfer printing ribbon 15.

As shown in FIGS. 8 and 12, the ribbon cassette 35 includes two parallel take up cores 32 and 33 adapted to take up opposite ends of the thermal transfer printing ribbon 15. The thermal head 11 is covered by the casing 34 with a portion of the thermal head exposed such that the intermediate portion of the thermal transfer printing ribbon will be interposed between the platen 10 and the thermal head 11.

A slot 53 extending in the axial direction of the take up cores 32 and 33 and with one end open is formed between the core receiving portions 34a and 34b of the casing 34, and driving force receiving ends 32a and 33a of the take up cores 32 and 33 are formed at the open ends of the slot 53.

As shown in FIGS. 8, 12 and 13, the casing 34 of the ribbon cassette 35 is formed to have a U shaped section forming a space accomodating a member 30 integrally formed between the casing 34 and the thermal head 11 mounted in the head holder 31.

The width of the thermal transfer printing ribbon 15 is made to be larger than the maximum diameters of the ribbon taken up by cores 32 and 33, while the depth of the slot 53 provided for casing 34 is made to be larger than one half of the width of the ribbon 15.

The whole length L of the casing 34 defining the cassette 35 comprises two sections $l_1$ and $l_2$, the latter being divided into two parts by slot 53. The width t of the slot 53 is slightly larger than the thickness of the cassette receiving portion 29c of the frame block 29, while the depth of the slot 53 is made to be substantially equal to the width of the cassette receiving portion.

Consequently, to mount the ribbon cassette, the opened end of the slot 53 is brought to face the end surface of the cassette receiving portion 29c and then the ribbon cassette 35 is pushed along its longitudinal direction (axial direction of the platen) for causing the cassette receiving portion 29c to engage with the slot 53 as shown in FIG. 13. Conversely, the ribbon cassette can be withdrawn by pulling the same.

Insertion and withdrawal of the ribbon cassette 35 can be made by opening a door 55 normally closing an opening 54 formed through the front surface of the housing 1 (see FIG. 1).

Figure 14A:
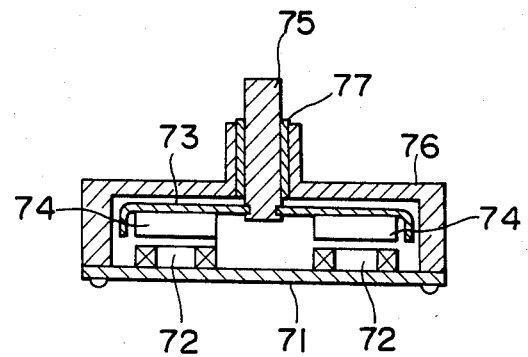
FIG. 14A is a vertical sectional view showing the construction of the motor.
Figure 14B:
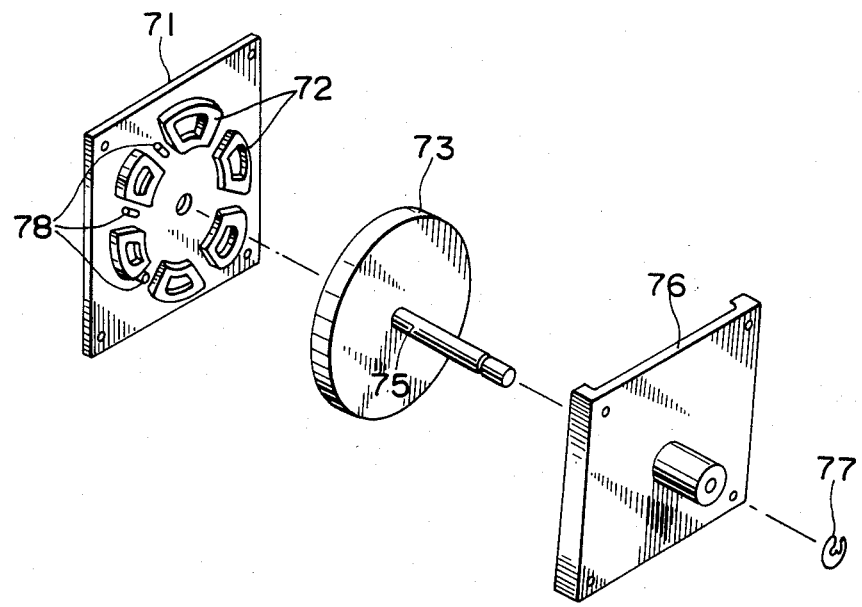
FIG. 14B is an exploded perspective view of the motor.
Figure 14C:
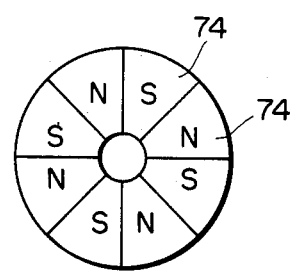
FIG. 14C is a plan view showing the polarity of permanent magnets of the motor.

FIGS. 14A-14C show the construction of the ribbon driving motors 51a and 51b. Six trapezoidal coils 72 are secured to a printed board 71 along a circle and at an equal spacing. The rotor 73 of the motor is provided to confront these circularly arranged coils 72. As shown in FIG. 14C, magnetized permanent magnets 74 are provided for the surface of the rotor 73 confronting the coils 72. The shaft 75 of the rotor penetrates through a casing 76 secured to the printed board 71 and is prevented from being withdrawn by an E ring 77. Three Hall elements 78 are provided each between adjacent coils. These Hall elements 78 are used to detect the position of the permanent magnets 74 of the rotor, and the signals detected by the Hall elements are used as the phase switching timing signals of the motor.

Figure 15:
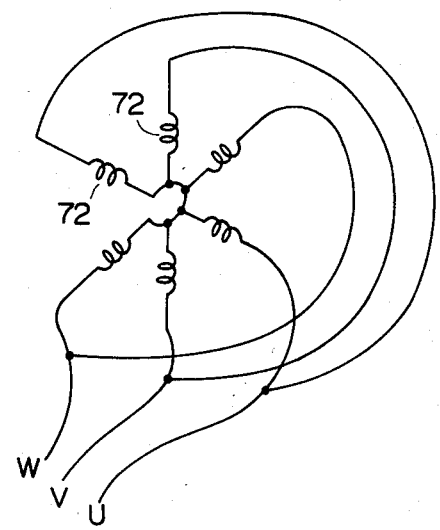
FIG. 15 shows a connection diagram of the motor.
Figure 16:
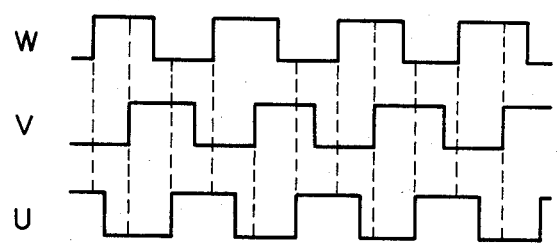
FIG. 16 is a timing chart for driving the motor.

The coils 72 are connected as shown in FIG. 15 for supplying timing signals shown in FIG. 16 to terminals U, V and W, whereby the motor is rotated by the mutual action between the magnetic flux generated by the coils 72 and the magnetic flux produced by permanent magnets 74 of the rotor 73.

Figure 17:
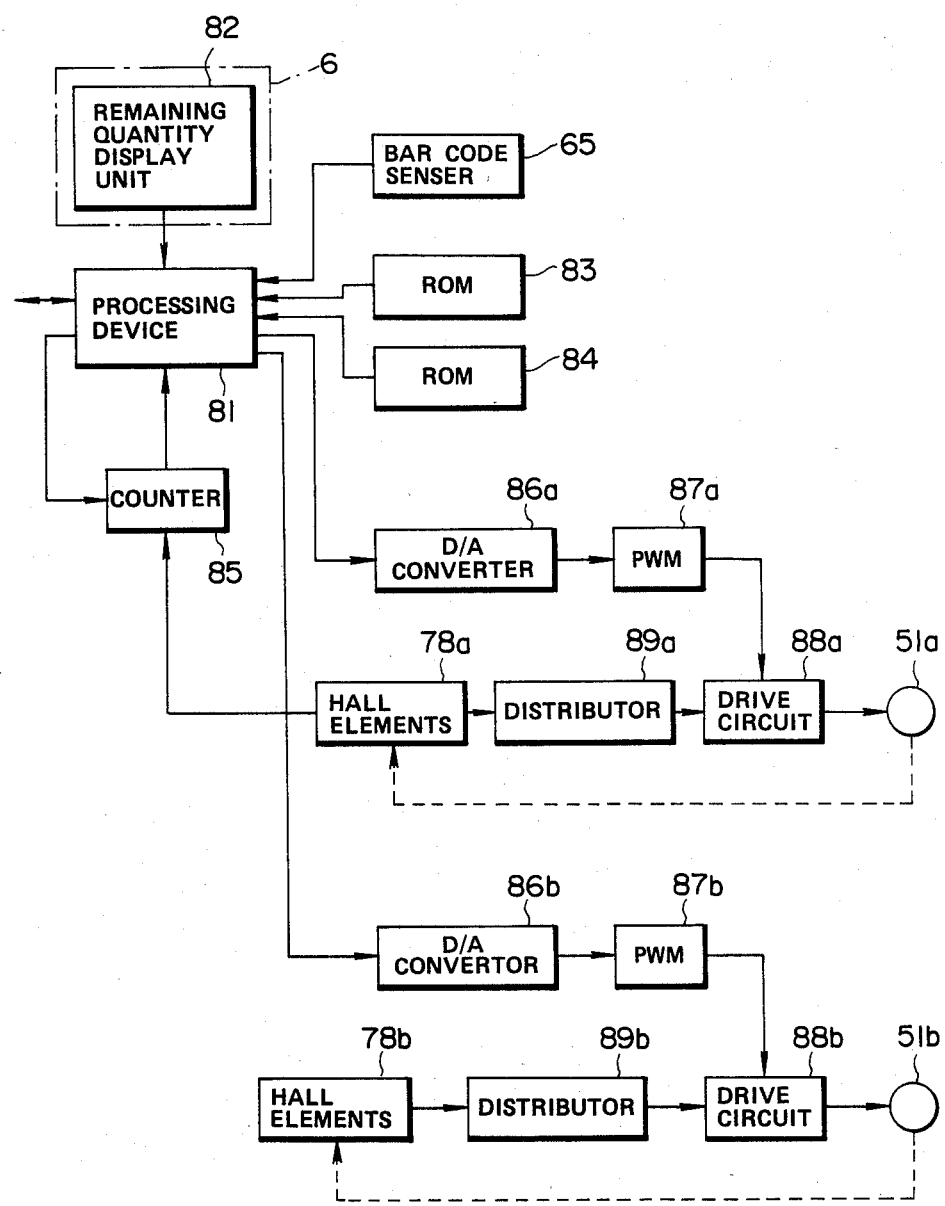
FIG. 17 is a block diagram showing a control circuit for driving the thermal transfer printing ribbon.

FIG. 17 shows a thermal transfer printing ribbon driving control circuit in which a processing device 81 is constituted by a microcomputer, for example. To the processing device 81 are connected the remaining quantity display unit 82 installed in the display device 6 for displaying the remaining quantity of the thermal transfer printing film 15 and the bar code sensor 65 described above. To the processing device 81 are also connected a ROM (read only memory device) 83 storing the control informations of the ribbon driving motors 51a and 51b, a ROM 84 storing a control information necessary to display the remaining amount of the thermal transfer printing ribbon 15, a counter 85 for detecting the number of revolutions of the ribbon driving motor (for example 51a) and D/A converters 86a and 86b supplied with the control information read out from ROM 83. The processing device 81 interchanges signals with the general control unit 14 shown in FIG. 7 for executing various controls. In response to the output signal from the bar code sensor 65, the processing device 81 outputs the reset, start and stop signals of the counter 85. Furthermore the processing device 81 reads out predetermined control informations from ROMs 83 and 84 in accordance with the count supplied from the counter 85 for supplying the control informations to D/A converters 86a and 86b and display unit 82.

In response to the start signal from the processing device 81, the counter 85 counts the number of pulse signals outputted from the Hall elements 78 of the ribbon driving motor (for example 51a) and stops the counting operation in accordance with the stop signal. After terminating the counting operation, the count of the counter is supplied to the processing device 81.

Figure 18A:
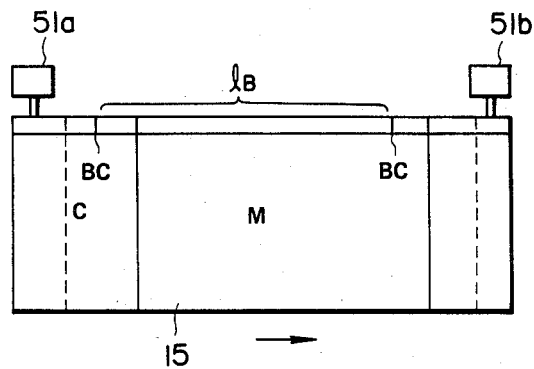
FIG. 18A is a plan view showing a device for detecting the diameter of a wound thermal transfer printing ribbon.
Figure 18B:
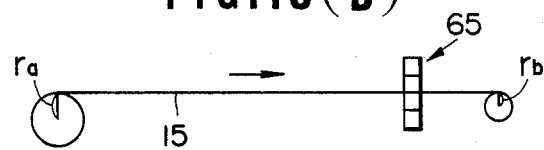
FIG. 18B is a side view of the device shown in FIG. 18A.

The remaining quantity of the thermal transfer printing ribbon and the count of the counter have the following relation. More particularly, as shown in FIGS. 18A and 18B, let us denote the distance between the bar codes BC on the transfer printing ribbon 15 by $l_B$, and the radius of the roll of the ribbon on the pay out side by $r_a$, and the radius of the roll of the ribbon on the take up side by $r_b$. Then the numbers of revolutions $n_a$ of the pay out motor 51a and those $n_b$ of the take up motor 51b while the ribbon is moved over the distance $l_B$ are expressed as follows $$n_a = \frac{l_B}{2\pi r_a} \quad (1)$$

$$n_b = \frac{l_B}{2\pi r_b} \quad (2)$$

Denoting the number of pulses outputted from three Hall elements by $C_o$ while the ribbon driving motors 51a and 51b rotate one revolution, the numbers of pulses produced during the numbers of revolutions $n_a$ and $n_b$ expressed by equations (1) and (2) are expressed as follows $$\text{pay out side } C_a = C_o n_a = C_o \frac{l_B}{2\pi r_a} \quad (3)$$

$$\text{take up side } C_b = C_o n_b = C_o \frac{l_B}{2\pi r_b} \quad (4)$$

Consequently, the radii $r_a$ and $r_b$ of the ribbon coils on the pay out side and take up side are expressed respectively by $$r_a = \frac{l_B C_o}{2\pi C_a} \quad (5)$$

$$r_b = \frac{l_B C_o}{2\pi C_b} \quad (6)$$

Since $l_B$ and $C_o$ in equations (5) and (6) are constants, the radii $r_a$ and $r_b$ of the ribbon coils can be determined from the pulse number $C_a$ or $C_b$. Consequently where the control informations of the motors 51a and 51b are read out from ROM 83 in accordance with the pulse number $C_a$ or $C_b$, the torque of the motors 51a and 51b can be controlled. Further, when the display information is read out from ROM 84 the remaining quantity of the ribbon 15 can be displayed.

The control of motors 51a and 51b will now be described. As shown in FIGS. 19A-19D, the ROM 83 stores the control informations of motors 51a and 51b corresponding to the count of the counter 85. The control informations are different at the time of printing, at the time of reverse running of the ribbon, at the time of stopping the same, and at the time of running the ribbon without pressing the platen, and these control informations are set in accordance with the counts of the counter for respective operations. More particularly, FIG. 19A shows printing, FIG. 19B reverse running of the ribbon, FIG. 19C the stop of the ribbon and FIG. 19D the running of the ribbon without pressing the platen. These control informations are set to drive the ribbon under a constant torque in accordance with the diameter of the coil of the ribbon, that is the remaining quantity. In FIGS. 19A-19D each control information is constituted by 16 bits of 0, 1, 2, 3, 4, 5, 6, 7, 8, 9, A, B, C, C, E and F. In these figures DH represents the maximum torque, while FH the minimum torque.

Turning back to FIG. 17, the control informations read out from the ROM in accordance with the counts of the counter 85 are supplied to D/A converters 86a and 86b. Analog signals corresponding to the control informations and outputted from the D/A converter 86a and 86b are supplied to pulse width modulators (PWM) 87a and 87b respectively. In response to the inputted analog signals, PWM 87a and 87b produce pulse signals having different duty ratios. Each PWM is constituted by a saw tooth wave generator and a comparator, for example. The output signals from the PWMs 87a and 87b are supplied to drive circuits 88a and 88b respectively. The outputs of three Hall elements 78 of motors 51a and 51b are respectively supplied to distributors 89a and 89b which form phase switching signals corresponding to the position detection signals of the rotors outputted by respective Hall elements. Each distributor is constituted by a comparator supplied with the output signals of the Hall elements and a current switching circuit supplied with the output of the comparator. The phase switching signals outputted from the distributors 89a and 89b are supplied to the drive circuits 88a and 88b which control the currents flowing through the windings of the ribbon driving motors 51a and 51b in accordance with the phase switching signals, the values of the currents being determined by the ON duty of the pulse signals outputted from the PWMs 87a and 87b. The ribbon driving motors 51a and 51b are driven by the output currents of the drive circuits 88a and 88b.

Figure 20:
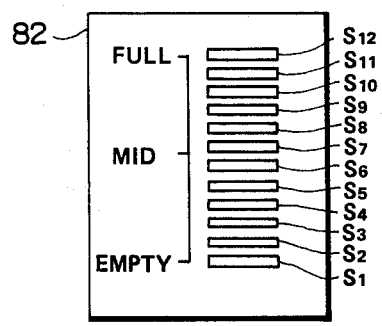
FIG. 20 is a plan view showing a remaining quantity display device.

The remaining quantity of the thermal transfer printing ribbon is displayed in the following manner. FIG. 20 shows the remaining quantity display unit 82 for the thermal transfer printing ribbon 15. The display unit 82 comprises an array of a plurality of liquid crystal display elements $S_1$–$S_{12}$ which are lighted in accordance with the coil diameter of the ribbon 15 on the pay out side. As above described, the remaining quantity of the ribbon can be determined based on the count of the counter 85 obtainable while the ribbon 15 is moved along the distance between bar codes BC. In response to this count of the counter, the processing device 81 reads out a display information corresponding to the remaining quantity of the ribbon from ROM 84 to send the display information to the remaining quantity display unit 82.

Figures 21, 22:
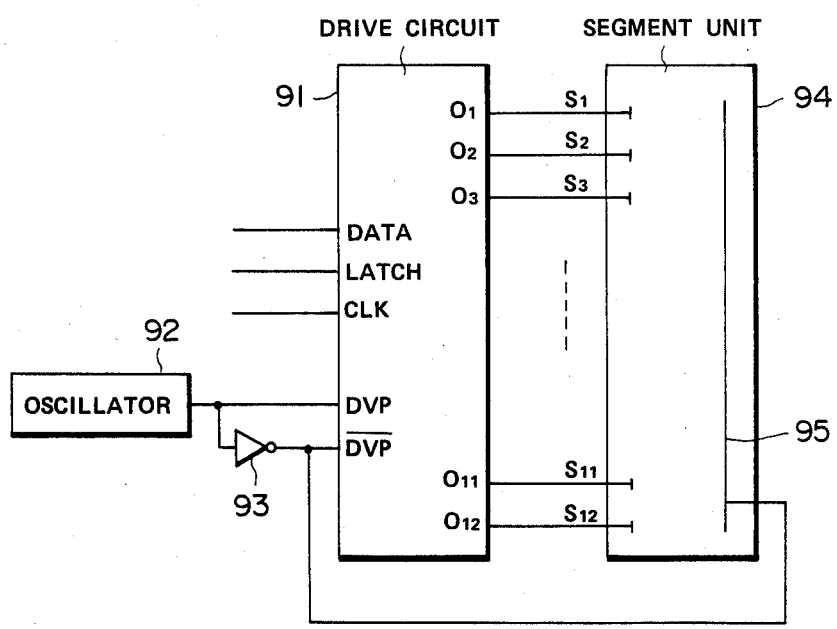
FIG. 21 shows the construction of the ROM shown in FIG. 17.
FIGS. 22 and 23 are block diagrams respectively showing the circuit construction of the remaining quantity display unit.

FIG. 21 shows the display information stored in the ROM 84. The display information is made up of bits of the same number as the liquid crystal display elements $S_1$–$S_{12}$ and comprises lighting informations of the liquid crystal display elements $S_1$–$S_{12}$ corresponding to the counts of the counter. The display information read out from the ROM 84 is supplied to the remaining quantity display unit 82.

FIG. 22 shows the liquid crystal display element drive circuit for the remaining quantity display unit 82. The display information read out from ROM 84 is applied to the DATA terminal of the drive circuit 91, while a latch signal and a clock signal are applied to LATCH terminal and CLK terminal respectively from the processing device 81. An oscillator 92 generates a drive pulse signal (DVP) of a frequency optimum for driving the liquid crystal display elements $S_1$–$S_{12}$. The DVP signal is supplied to the drive pulse (DVP) terminal of the drive circuit 91 and to the $\overline{\text{DRIVE PULSE}}$ ($\overline{\text{DVP}}$) terminal via an inverter 93. The output terminals $O_1$–$O_{12}$ of the drive circuit 91 are respectively connected to the liquid crystal display elements $S_1$–$S_{12}$ of the segment unit 94, while the $\overline{\text{DVP}}$ terminal is connected to the common electrode 95 of the segment unit 94.

Figure 23:
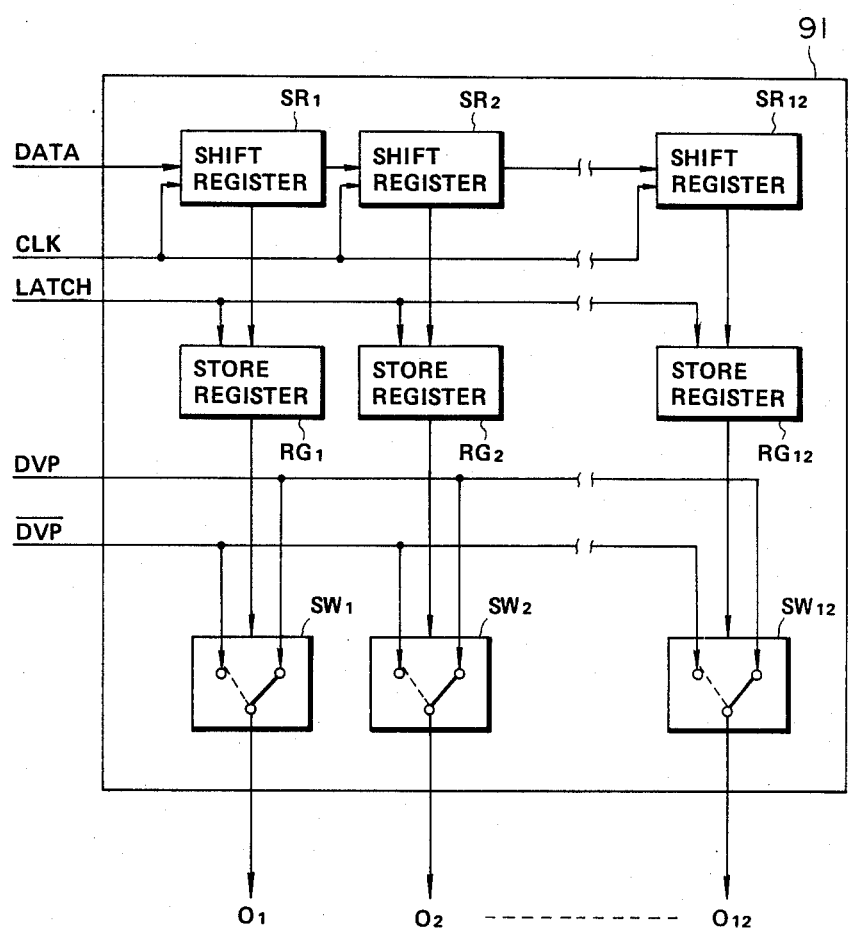

FIG. 23 shows the construction of the drive circuit 91, including shift registers $SR_1$–$SR_{12}$ which sequentially shift the display information inputted to DATA terminal in synchronism with a clock signal supplied to the CLK terminal. The display information sequentially shifted by the shift registers $SR_1$–$SR_{12}$ is held in corresponding store registers $RG_1$–$RG_{12}$ by a latch signal supplied to a LATCH terminal. Switches $SW_1$–$SW_{12}$ are controlled by the display informations held in respective store registers $RG_1$–$RG_{12}$, for outputting a DVP signal or a $\overline{\text{DVP}}$ signal at the output terminals $O_1$–$O_{12}$. More particularly, when the contents of the store registers $RG_1$–$RG_{12}$ are "1", the DVP signal is outputted from corresponding output terminals $O_1$–$O_{12}$, whereas when the contents of the store registers $RG_1$–$RG_{12}$ are "0", the $\overline{\text{DVP}}$ signal is outputted from corresponding output terminals $O_1$–$O_{12}$.

Figure 24:
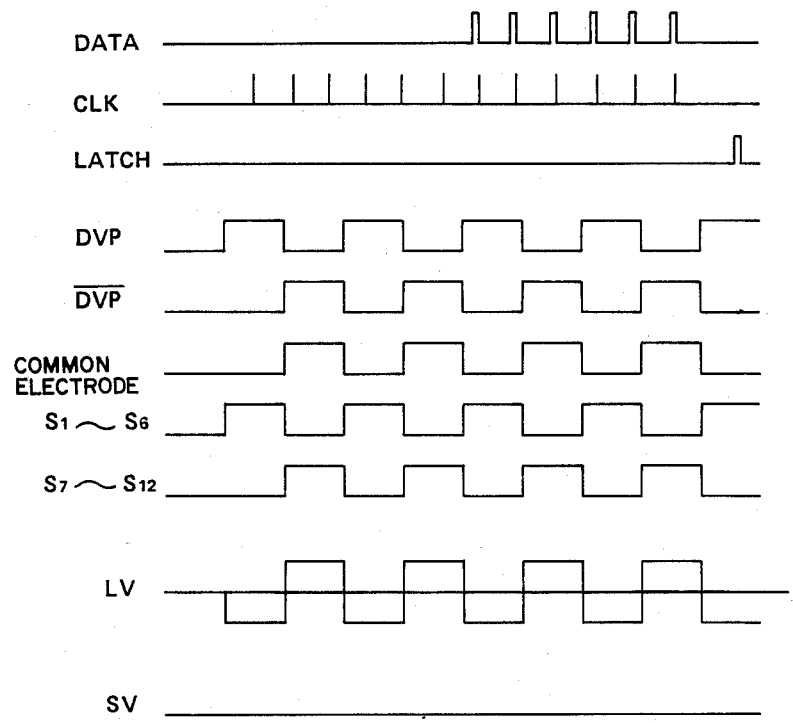
FIG. 24 is a timing chart useful to explain the operation of the remaining quantity display unit.

FIG. 24 is a timing chart showing the operations of various parts of the drive circuit 91 and the segment unit 94 which corresponds to a case wherein the remaining quantity of the thermal transfer printing ribbon is one half. In this case, the display information is represented by "000000111111" which is shifted by shift registers $SR_1$–$SR_{12}$ in synchronism with the clock signal. Upon completion of the shift, the latch signal is imputted so as to hold the contents of shift registers $SR_1$–$SR_{12}$ in store registers $RG_1$–$RG_{12}$ respectively. Consequently, DVP signals are outputted from output terminals $O_1$–$O_6$ corresponding to store registers whose contents are "1", whereas $\overline{\text{DVP}}$ signals are outputted from the output terminals corresponding to store registers $RG_1$–$RG_{12}$ whose contents are "0". The signals outputted from output terminals $O_1$–$O_{12}$ are supplied to respective liquid crystal display elements $S_1$–$S_{12}$, while a DVP signal is supplied to the common electrode 92. Consequently, lighting voltage LV is applied to the liquid crystal display elements $S_1$–$S_6$ while the same phase voltage SV is applied to the liquid crystal display elements $S_7$–$S_{12}$, with the result that the liquid crystal elements $S_1$–$S_6$ are lighted to display the remaining quantity.

Figure 25A:
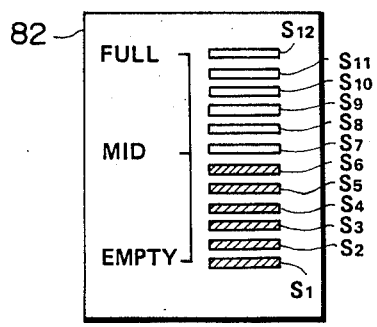
FIGS. 25A and FIG. 25B show examples of display of the remaining quantity display unit.
Figure 25B:
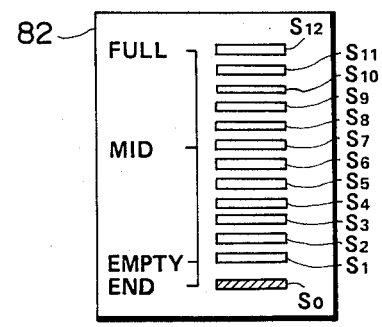

As above described, the opposite ends of the thermal transfer printing ribbon 15 are connected to the winding cores 33 and 32. For this reason, when the entire length of the ribbon 15 has been played out, motors 51a and 51b become inoperable. Consequently, the Hall elements 78 do not produce pulse signals so that the count of the counter 85 becomes zero, for example. Utilizing this fact, when the count of the counter 85 is zero, the processing device 81 outputs a ribbon end signal which may be displayed by the remaining quantity display unit 82. FIG. 25B shows one example of display of the ribbon end in which $S_o$ shows a similar liquid crystal display element.

The drive control of the thermal transfer printing ribbon 15 will be described with reference to FIGS. 26A–26F in which $T_{aiF}$, $T_{biF}$ show motor torques for running in the forward direction which are used for detecting bar codes. $T_{aiS}$, $T_{biS}$ show motor torques for stopping after closing a source switch and bar codes have been detected.

$T_{aiB}$, $T_{biB}$ show motor torques at the time of counting the number of outputs of the Hall elements after closing the source switch.

The motor torques after detecting the ribbon coil diameter are shown as follows wherein T(r) represents that torque T is a function of the ribbon coil diameters.

$T_{aA}(r_a)$, $T_{bA}(r_b)$ show the motor torque for stopping the ribbon, $T_{aM}(r_a)$, $T_{bM}(r_b)$ show the motor torque for running the ribbon in the forward direction, $T_{aP}(r_a)$, $T_{bP}(r_b)$ show the motor torque at the time of printing.

$T_{aH}(r_a)$, $T_{bH}(r_b)$ show the motor torque at the time of peeling off the ribbon, $T_{aB}(r_a)$, $T_{bB}(r_b)$ show the motor torque for running the ribbon in the opposite direction.

These torques $T_{aiF}$, $T_{biR}-T_{aB}(r_a)$, $T_{bB}(r_b)$ are obtained when the control information stored in the ROM 83 is read out in accordance with the count of the counter 85, and then supplied to motors 51a and 51b via D/A converters 86a and 86b, PWMs 87a and 87b, and drive circuits 88a and 88b. Opposite torques are normally generated by motors 51a and 51b so that the direction of running of the ribbon can be determined by changing the relative magnitude of torques. The symbol If represents the leading edge of the ink, $l_r$ the trailing end of the ink, $P_f$ the leading end of the copying paper P, and $P_r$ the trailing end of the copying paper P.

When the source switch, not shown, is closed, initial operations (1)–(4) shown in FIG. 26A are performed, whereby the present ribbon coil diameter is detected. More particularly, as shown by (1) in FIG. 26A, when the ribbon 15 runs in the forward direction under a certain tension (which is the direction of effecting normal printing), and when the bar code sensor 65 detects a bar code $BC_1$, the ribbon is stopped as shown by (2) in FIG. 26A. Thereafter, as shown by (3), the ribbon 15 runs in the reverse direction, and the number of the pulse signals outputted by the Hall elements of the motor 51a is counted by counter 85 during a period in which bar codes $BC_1$ and $BC_2$ are detected. As shown by (4) in FIG. 26A, upon detection of the bar code $BC_2$, the counting operation of the counter terminates and the count represents the present coil diameter of the ribbon, that is the remaining quantity of the ribbon 15, so that a display information corresponding to this count is read out from ROM 84, which displays the remaining quantity on the display unit 82 in a manner as above described. Also a control information of the motor corresponding to the count is read out from ROM 83 and supplied to the D/A converters 86a and 86b.

After completing the initial operation, when a printing button, not shown, is depressed the printing operation shown in FIGS. 26A–26D are performed. More particularly, as shown by (5) in FIG. 26B, both the thermal transfer printing ribbon 15 and the platen are driven while they are maintained in contact with each other so as to align the positions of the copying paper P and the ink of the ribbon 15. At this time, the paper feed speed $V_P$ of the platen 10 is higher than the running speed $V_R$ of the ribbon 15. Upon completion of the alignment of the speed of the ink of the ribbon 15 and the copying paper P, the ribbon and the copying paper are stopped as shown by (6) in FIG. 26B and thereafter the thermal head 11 is pressed as shown by (7) in FIG. 26B. Then, as shown by (8), the platen 10 is driven and the ribbon 15 is driven by the torque corresponding to the read out control information so that the ink of the ribbon 15 is transfer printed onto the copying paper by the thermal head 11. As shown by (9) of FIG. 26C, upon completion of the printing, the torques of both motors 51a and 51b are immediately varied so that as shown by (10) in FIG. 26C, the platen 10 and the ribbon 15 are driven in the opposite directions to peel off or separate the ribbon 15. As shown by (10), after peeling off, the pressure applied to the thermal head 11 is released as shown by (12) in FIG. 26C. At this time, the ribbon 15 is stopped under a predetermined tension.

Figure 26F:
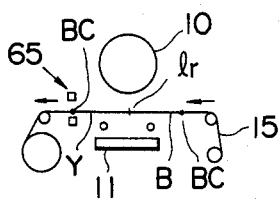

After that, as shown by 13 of FIG. 26D, the platen 10 is rotated in the opposite direction and the copying paper P is returned to the original position, while at the same time, the ribbon 15 is driven in the forward direction to effect position alignment of the ribbon 15 and the copying paper P. Upon completion of the position alignment, as shown by 14 in FIG. 26D, both the platen 10 and the ribbon 15 are stopped. This stopping is effected by the detection of the bar code BC with the bar code sensor 65. Then, as shown by (15), the thermal head is pressed and under this state, as shown by (16), the leading edges of the copying paper P and the ink of the ribbon 15 are aligned. After that, operations shown by (8)–(16) in FIGS. 26B–26D are repeated to print four colors including black color. As shown by (17) and (18) in FIG. 26E, when the printing of the last black color "B" is completed, and the paper discharge and the peel off are completed, the pressure applied to the thermal head is released as shown by (19) in FIG. 26E, and the ribbon 15 is driven in the opposite direction as shown by (20). Then as shown by (21) in FIG. 26F, the bar code BC attached to yellow (Y) is detected to stop the apparatus as shown by (22) for the preparation of the next printing operation. In the above described operations, at steps of printing shown by (8), peel off shown by (10), and alignment of the leading edges of the ribbon and the copying paper P, the coil diameter of the ribbon is detected by the count of the counter 85 and in accordance with the count, a required control information is read out to control the torques of motors 51a and 51b. The timings of start and stop of the counter at the time of printing are effected in synchronism with the rotation of the platen 10. Although in the foregoing description, the timings of starting and stopping of the counter during the initial operation are controlled by the detection of the bar codes, such control can be made in synchronism with the rotation of the platen 10 as shown in FIGS. 27A and 27B. More particularly, as shown by (1) in FIG. 27A, the ribbon 15 runs under a predetermined tension until the bar code sensor 65 detects a bar code BC. When the bar code BC is detected the ribbon 15 is stopped as shown by (2) in FIG. 27A. After that, the thermal head 11 is urged as shown by (3), and under this state, the platen 10 and the ribbon 15 are driven as shown by (4) while at the same time, the number of pulses produced by the Hall elements of motor 51a are counted by the counter 85. When the ribbon 15 has been runned by 202.6 mm, for example, the platen 10 and the ribbon 15 are stopped as shown by (5) in FIG. 27B and the counting operation of the counter 85 is also stopped. At this time, the coil diameter of the ribbon is detected and in response thereto, the display information of the remaining quantity and the motor control information are read out from ROMs 83 and 84 respectively. Then, as shown by (6) in FIG. 27B, the platen 10 and the ribbon 15 are driven in the opposite directions and then stopped as shown by (7) after they have been moved over the distance described above. Thereafter, the pressure applied to the thermal head 11 is released as shown by (8) in FIG. 27B.

In FIGS. 27A and 27B, $T_{aic}$ shows motor torque for forward running utilized for detecting the bar code.

$T_{ai}$, $T_{bi}$ represents the motor torques for stopping the running after the source switch has been closed and the bar code has been detected.

In the embodiment described above, the number of pulses produced by the Hall elements of the ribbon driving motor 51a is counted by the counter 85 and the control information of the driving motor corresponding to the count is read out from ROM 83 and the torques of the motors 51a and 51b are controlled in accordance with the control information. Consequently, as it is possible to determine the optimum tension of the ribbon in accordance with the coil diameter thereof wrinkle or loop of the ribbon can be efficiently prevented. Furthermore, when the ribbon is thin, its breakage can be prevented.

Moreover, the motors 51a and 51b are rotated in the opposite directions so as to run the ribbon in the forward or reverse direction depending upon the relative magnitudes of the torques of these motors. Consequently, even when the not copying lengths between inks is reduced, it is possible to precisely align the positions of the inks, thus increasing the printing speed.

Further, in accordance with the count of the counter 85, a corresponding display information is read out from ROM 84, which is used to display the remaining quantity of the ribbon 15. Accordingly, it is possible to readily know the remaining quantity of the ribbon without relying upon visual confirmation as in the prior art.

Moreover, at the time of closing the source switch, the initial operation is firstly executed to determine the coil diameter of the ribbon, so that even when a partially used ribbon cassette is set, the remaining quantity of the ribbon can be detected and displayed at once. Accordingly, motors 51a and 51b can exert torques corresponding to the remaining quantity so that accurate operation can be ensured.

In the foregoing embodiment, pulse signals generated by the Hall elements of the motor 51a are applied to the counter, but pulse signals generated by the Hall elements of motor 51b can also be used for the same purpose.

It will be clear that means for generating pulse signals corresponding to the numbers of revolutions of motors 51a and 51b is not limited to Hall elements, and that such other r.p.m. detector as an rotary encoder can also be used.

Furthermore, for displaying the remaining quantity of the thermal transfer printing ribbon, a bar graph type display unit was used, but the remaining quantity of the ribbon can be directly displayed digitally or displayed after converting the remaining length into usable number of copying papers.

In the foregoing embodiment, although the conveying apparatus of this invention was applied to color picture image forming apparatus utilizing inks of multicolors, the conveying apparatus of this invention is also applicable to a conventional two value (binary) picture image (white and black) utilizing single color ink, and to a tape recorder. Where the conveying apparatus of this invention is applied to these apparatus, it is advantageous to use the method of this invention shown in FIGS. 27A and 27B for detecting the remaining quantity of the ribbon. Where the method shown in FIGS. 27A and 27B is applied to the two value picture image forming apparatus and the tape recorder, marking of the bar codes BC to the belt-shaped material to be conveyed is not always necessary. In the case of the tape recorder, a suitable roller corresponding to the platen 10 is provided. Especially in the case where the tape recorder is of cassette tape type in which a cassette tape is employed as a recording medium, length of the tape can be known from the types of cassette tape, i.e., 30-minute type, 60-minute type, 90-minute type, etc. The data on such cassette tape types may be inputted through a key operation by an operator or it may be so designed that the tape recorder has detecting means for automatically detecting these cassette tape types currently used.

It should be understood that the invention is not limited to the specific embodiment described above and that many modifications and changes will be obvious to one skilled in the art without departing the true spirit and scope of the invention as defined in the appended claims.

What is claimed is:

1. An apparatus for conveying a belt-shaped material having opposite ends secured to respective winding cores, at least one of said winding cores being connected to a motor so that said material is conveyed from one winding core to the other in the longitudinal direction of said material along a conveying path by rotation of said motor, and said material including marks provided at a given interval along said longitudinal direction of said material, said apparatus comprising:
   mark sensor means for detecting said marks at a given position of said conveying path of said material;
   pulse generating means for generating a pulse each time said motor rotates by a predetermined angle;
   counting means for counting the pulses generated by said pulse generating means, said counting means being reset each time one of said marks is detected by said mark sensor means;
   calculating means for calculating the remaining length of said material based on the count of said counting means each time one of said marks is detected; and
   display means for displaying said calculated remaining length of the material.

2. The apparatus of claim 1, wherein said calculating means includes first memory means for storing data concerning the remaining length of said material in the form of a table with respect to the respective counts of said counting means, said data concerning the remaining length being read out from said first memory means by using said count of said counting means as address information.

3. The apparatus of claim 1, wherein said calculating means includes means for detecting when said remaining length of said material is zero by detecting when the count of said counting means becomes constant, and said display means includes means for displaying the fact that the remaining length is zero.

4. The apparatus of claim 2 wherein said belt-shaped material includes a transfer printing member utilized in a picture image forming apparatus, said transfer printing member being successively coated with a plurality of coloring agents at a predetermined interval along said longitudinal direction of said material, and wherein said marks comprise bar codes representing coated positions of said coloring agents.

5. The apparatus of claim 4, wherein said belt-shaped material is incorporated into a cassette suitable for being detachably loaded in said conveying apparatus.

6. The apparatus of claim 2, wherein each of said winding cores is connected to an individual motor, the directions of torque generated by said motors being opposite to each other so as to convey said material under tension, and said apparatus further comprises control means for controlling the operation of said motor by adjusting the torques thereof based on the count of said counting mean fed into said calculating means.

7. The apparatus of claim 6, wherein said control means includes second memory means for storing torque data corresponding to the torques of said motors in the form of a table with respect to the respective counts of said counting means, means for reading out said stored torque data from said second memory means by using the counts of said counting means as address information, and means for driving said motors to produce said torques in accordance with said torque data.

8. An apparatus for conveying a belt-shaped material having opposite ends secured to respective winding cores, at least one of said winding cores being connected to a motor so that said material is conveyed from one winding core to the other in the longitudinal direction of said material along a conveying path by rotation of said motor, said apparatus comprising:
roller means disposed between said winding cores and urged against said material, said roller means being rotated to follow the conveying of said material;
angle detecting means for detecting the rotated angle of said roller means each time said roller means rotates by a predetermined angle;
pulse generating means for generating a pulse each time said motor rotates by a predetermined angle;
counting means for counting the pulses generated by said pulse generating means, said counting means being reset each time said angle detecting means detects when said roller means is rotated by said predetermined angle;
calculating means for calculating the remaining length of said material based on the count of said counting means each time said angle detecting means detects that said roller means is rotated by said predetermined angle; and
display means for displaying said calculated remaining length of the material.

9. The apparatus of claim 22, wherein said calculating means includes first memory means for storing data concerning the remaining length of said material in the form of a table with respect to the respective counts of said counting means, said data concerning the remaining length being read out from said first memory means by using said count of said counting means as address information.

10. The apparatus of claim 8, wherein said calculating means includes means for detecting when said remaining length of said material is zero by detecting when the count of said counting means becomes constant, and said display means includes means for displaying the fact that the remaining length is zero.

11. The apparatus of claim 9, wherein said belt-shaped material includes a transfer printing member coated with a coloring agent of a picture image forming apparatus, and wherein said roller means comprises a platen engaged with a printing head to be urged against said transfer printing member.

12. The apparatus of claim 11, wherein said transfer printing member comprises a sheet coated with thermofusible or vaporizable ink acting as said coloring agent, and wherein said printing head comprises a thermal head.

13. The apparatus of claim 12, wherein said belt-shaped material is incorporated into a cassette suitable for being detachably loaded in said conveying apparatus.

14. The apparatus of claim 9, wherein each of said winding cores is connected to an individual motor, the directions of torque generated by said motors being opposite to each other so as to cause said material to be under tension, and said apparatus further comprises control means for controlling the operation of said motors by adjusting the torques thereof based on the count of said counting means fed into said calculating means.

15. The apparatus of claim 14, wherein said control means includes second memory means for storing torque data corresponding to the torques of said motors in the form of a table with respect to the respective counts of said counting means, means for reading out said stored torque data from said second memory means by using the counts of said counting means as address information, and means for driving said motors to produce said torques in accordance with said torque data.

16. An apparatus for conveying a belt-shaped material having opposite ends secured to respective winding cores, each of said winding cores being connected to an individual motor so that said material is conveyed from one winding core to the other in the longitudinal direction of said material along a conveying path by rotation of said motors, said apparatus comprising:
pulse generating means for generating a pulse each time at least one of said motors rotates by a predetermined rotor angle;
counting means for counting the pulses generated by said pulse generating means;
calculating means for calculating the remaining length of said material based on the count of said counting means; and
control means for controlling said motors so as to cause the directions of torque generated by said motors to be opposite to each other whereby said material is conveyed under tension, and for controlling the operation of said motor by adjusting the torques thereof based on the count of said counting means fed into said calculating means.

17. The apparatus of claim 16, wherein said control means comprises memory means for storing torque data corresponding to the torques of said motors in the form of a table with respect to the respective counts of said counting means, means for reading out said stored torque data from said memory means by using the counts of said counting means as address information, and means for driving said motors to produce said torques in accordance with said torque data.

18. The apparatus of claim 19, wherein said belt-shaped material includes marks provided at a given interval along said longitudinal direction of said material, and said apparatus further comprises mark sensor means for detecting said marks at a given position of said conveying path of said material, said control means picking up the count of said counting means each time one of said marks is detected by said mark sensor means.

19. The apparatus of claim 17, further comprising:
roller means disposed between said winding cores and urged against said material, said roller means being rotated to follow the conveying of said material; and
angle detecting means for detecting the rotated angle of said roller means each time said roller means rotates by a predetermined roller angle;
wherein said control means picks up the count of said counting means each time said angle detecting means detects that said roller means rotates by said predetermined roller angle.

* * * * *